UNITED STATES PATENT OFFICE.

FRANZ MÜNCH, OF WILSDRUFF, GERMANY.

PROCESS OF PHOTOMECHANICAL COLOR-PRINTING.

No. 841,883.      Specification of Letters Patent.      Patented Jan. 22, 1907.

Application filed May 20, 1905. Serial No. 261,289.

*To all whom it may concern:*

Be it known that I, FRANZ MÜNCH, a subject of the King of Saxony, residing at Wilsdruff, Saxony, Germany, have invented certain new and useful Improvements in Processes of Photomechanical Color-Printing, of which the following is a specification.

My invention relates to a process of photomechanical color-printing, of which the following is a description.

This process consists in preparing a clear and full photographic negative from which are printed a number of positive photographic prints on printing-out paper—such, for instance, as matte celluloid paper. These photographic prints vary successively in depth or strength—that is, some are printed longer than others. These positive photographic prints, if necessary, are retouched in black and white in a well-known manner, whereby they are rendered in proper shape to form copy-sheets from which the printing-forms are prepared by photomechanical transfer.

The printing-plates for the darker-colored inks are prepared from the positive photoprints of the greater depth or strength, and the printing-plates for the lighter-colored inks are prepared from the positive photoprints of lesser intensity or strength. In this manner the darkest print is employed for the production of the printing-plate for the darkest-colored ink and the lightest print for the printing-plate for the lightest-colored ink.

In order that the invention may be better understood, the production of printing-plates for a five-colored chromotype—viz., blue, yellow, neutral, dark-red, and light-red—will be described. A photographic negative is first taken of the scene or object to be reproduced, from which negative five positive photographic prints—for instance, on matte celluloid paper—are made, successively varying them in intensity by varying the time of exposure. The darkest print serves as a copy-sheet for the printing-plate for the blue ink, the lightest print for the printing-plate for the light-red ink, and the intermediate prints for the printing-plates for the intermediate colors in the order specified. These prints may be retouched in black and white to further increase or decrease the intensity or strength thereof. For example, in the darkest print for the production of the blue-printing plate such parts thereof as are to appear without blue, or at least a very light shade thereof, are wholly or more or less covered with white, while those portions which are to appear in a deeper shade of blue must be covered with black. The paper pictures thus obtained and worked up I now reproduce on the printing-plates or films by means of the camera and render these printing-surfaces printable in the well-known manner.

In carrying out the new process there is, however, one point which is frequently to be considered. It often happens that on a paper print produced from the original negative the impressions of various objects of the original picture appear without their limiting lines being clearly defined, owing to the colors (in themselves different) of these objects being of the same value for the photographic plate and there having also by chance been no sharp outlines. This circumstance renders the working out of the colors more difficult. In such cases it is well to sketch in the outlines on the paper print in some suitable manner and to produce a new negative from the so-improved print, from which fresh negative, instead of from the original negative, the paper prints for working out the colors can be obtained. In many cases, however, it will be sufficient to merely touch up the original negative. After these photoprints have been retouched, as described, printing-plates are prepared therefrom by any suitable photomechanical transfer method, and from these plates the final picture is printed.

What I claim as new, and desire to secure by Letters Patent, is—

The process of color-printing, consisting in first producing a photographic negative of the scene to be reproduced, second, making from said negative a number of positive prints graduated in depth or strength by varying the time of exposure and corresponding in number to the number of colors to be printed, third, touching up these prints in white to decrease and in black to increase the intensity thereof, fourth, reproducing these worked up positives on printing plates or films by means of the camera, and fifth, printing from these in a well-known manner, substantially as and for the purpose set forth.

In testimony whereof I affix my signature in presence of two witnesses.

FRANZ MÜNCH.

Witnesses:
    CARL PREIERT,
    PAUL ARRAS.